July 14, 1970    W. H. CHAFFEE    3,520,446
CONDIMENT DISPENSER
Original Filed March 22, 1967
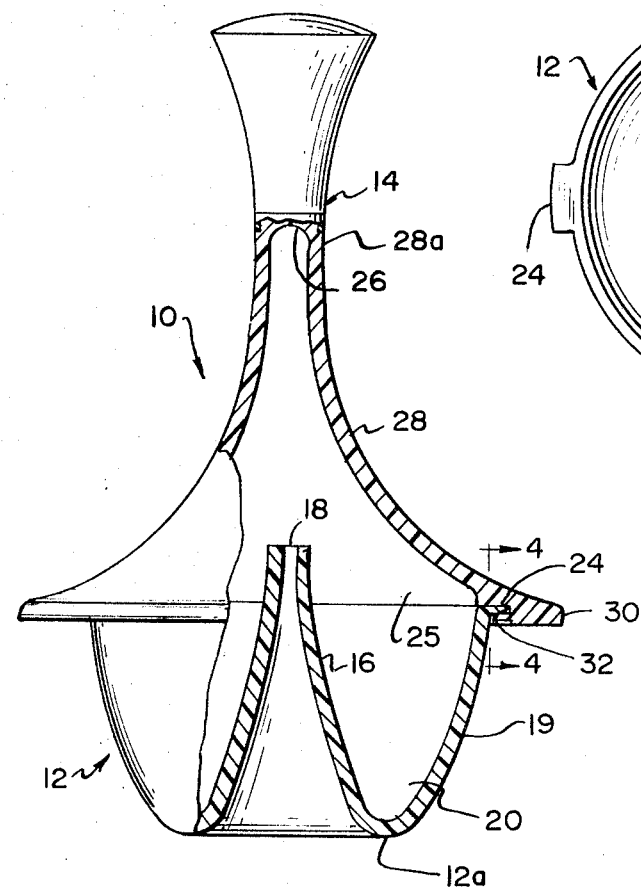
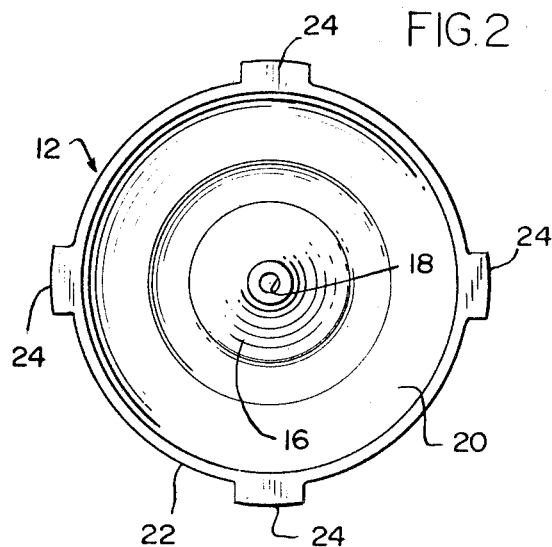
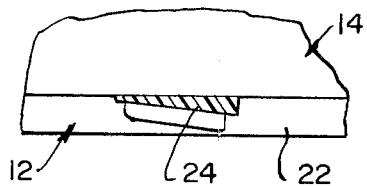
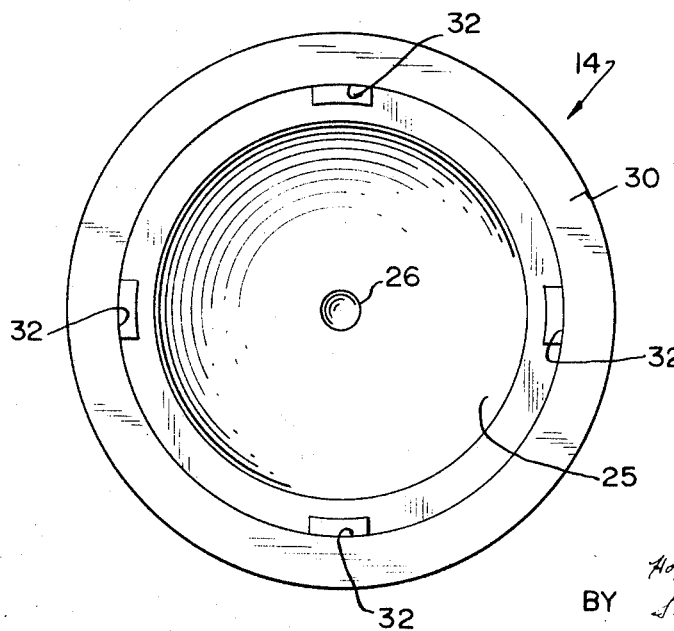
INVENTOR
WILLIAM H. CHAFFEE
BY Hofgren, Wegner, Allen, Stillman & McCord
ATTORNEYS.

3,520,446
CONDIMENT DISPENSER
William H. Chaffee, Hinsdale, Ill., assignor to Model Builders, Inc., a corporation of Illinois
Continuation of application Ser. No. 625,151, Mar. 22, 1967. This application Mar. 5, 1969, Ser. No. 805,120
Int. Cl. A47g 19/12
U.S. Cl. 222—457.5                                         2 Claims

ABSTRACT OF THE DISCLOSURE

An improved condiment dispenser of the type having an elevated discharge spout adjacent a recessed chamber wherein dispensation is accomplished by vertical to and fro movement while the dispenser is held upright, rather than inverted, the improvement being the shaping of the inner and outer walls of the condiment dispenser such as to tend to direct the condiment out the discharge spout when the shaking action is being accomplished, and in the shaping of the exterior of the condiment dispenser such as to naturally lend itself to a proper shaking action when the dispenser is grasped by a user.

---

This application is a continuation of application No. 625,151, filed Mar. 22, 1967, now abandoned.

BACKGROUND OF THE INVENTION

Field of the invention

This invention relates to condiment dispensers and more particularly to an improvement in the interior and exterior shape of condiment dispensers of the type which dispenses condiment out of the bottom of the shaker responsive to shaking the dispenser in an upright position, rather than an inverted portion.

Description of the prior art

The art known to the applicant is represented by the following patents: Cobelli, 1,718,684; Langton, 1,919,-280; Scharinger, 2,136,805; Thompson, 2,237,718; Sellers, 2,735,851; Cobelli, D. 142,374; Schilz, D. 145,228; Schilz, D. 145,229; McKee, D. 146,804.

SUMMARY OF THE INVENTION

This invention is directed, in brief, to condiment dispensers which dispense through an opening in the bottom by vertical to and fro shaking action when the dispenser is held in an upright position, the opening being formed elevated relative to the condiment storage chamber of the dispenser. In particular, the invention is directed to an improvement in the shaping of the interior and exterior walls of the condiment dispenser so as to cause the condiment to be deflected when it moves upward relative to the dispenser during the shaking action, into a path of travel which will cause it to fall out the discharge opening of the dispenser. The invention is further directed to an improvement in the configuration of the exterior walls such as to cause the dispenser to be naturally grasped in such a fashion as to orient the dispenser in the user's hand for proper shaking action.

BRIEF DESCRIPTION OF THE DRAWINGS

FIG. 1 is an elevational view, partially broken away in section, of the condiment dispenser of this invention;

FIG. 2 is a top plan view of the base portion of the condiment dispenser with the top portion removed;

FIG. 3 is a plan view, looking upward from the bottom of the top portion of the condiment dispenser; and FIG. 4 is a fragmentary sectional view, taken generally along the line 4—4 of FIG. 1.

DESCRIPTION OF THE PREFERRED EMBODIMENTS

The condiment dispenser 10 of this invention includes a base portion generally indicated 12 and a top portion generally indicated 14. The base portion is generally annular in form and includes a generally centrally upstanding frusto-conical discharge spout 16 which terminates in a truncated portion having a central opening 18. Exterior wall 19 of the base portion and the upstanding frusto-conical portion 16 define between them a condiment retaining chamber or well 20 in which the granular condiment material is normally kept. Peripheral edge 22 of the open top end of the base is below the truncated end of the discharge spout 16 so that the well 20 may be filled with condiment only to a point which will be below the discharge opening 18.

The peripheral edge 22 is also provided with a plurality of tabs projecting outwardly in a canted fashion. These tabs cooperate with mating surfaces on the top member to provide a means for locking the top member to the base as will be explained later.

The top 14 of the condiment dispenser is generally annular in plan. As viewed in side elevation or in vertical section, top 14 has converging side walls which curve upwardly from the bottom open end 25 and merge together in the interior at a juncture 26 in a narrowed area vertically spaced from the opening 18. The wall surface generally could be defined as formed by the revolution of a portion of a parabola around an axis which is intended to be coaxial with the center of the hole 18. The effect of the interior configuration of the inner wall of the top member is to cause the condiment material from the well 20 to be gathered in a funneling fashion in the area of the juncture 26 directly above the central opening 18 responsive to vertical displacement of the condiment occasioned by to and fro shaking so that when the condiment material descends responsive to gravity, it will be generally in alignment with the opening 18 for most efficient discharge from the dispenser 10.

In addition, outer wall 28, which is generally concentric with the inner wall 26, narrows down in a portion 28a considerably spaced above the opening 18. As a result, the natural inclination in grasping the condiment dispenser 10 will be to grasp it around the narrow area 28a in an upright fashion as is shown in FIG. 1. When the user so grasps the dispenser and imparts to it a rapid to and fro vertical movement, he will obtain better control over the discharge and dispensing of the contents in that his hand or fingers will be in the area 28a well spaced above the discharge opening 18 in discharge spout 16, grasping the dispenser 10 in a fashion as to generally "aim" it in the direction of application of its contents.

The peripheral rim 30 at the lower end of top portion 14 has spaced recesses 32 for receiving the locking tabs so that the top 14 may be engaged and disengaged from the base by a twisting action. In this manner, condiment may be filled by pouring directly into the well portion 20 and then the top 14 secured over the bottom 12 to place the dispenser in a condition for use.

The condiment dispenser of this invention affords an improved dispensation of condiment by the novel form of the interior walls of the top portion which insure that, responsive to to and fro shaking, condiment will gather in an area generally in alignment with the discharge opening for most effective dispensation. In addition, the outer configuration is such that the natural tendency will be to grasp the dispenser in such a fashion as will afford the best control over dispensation of the contents of the dispenser.

The foregoing detailed description has been given for clearness of understanding only, and no unnecessary limitations should be understood therefrom, as some modifications may be obvious to those skilled in the art.

I claim:
1. A condiment dispenser of the type which dispenses out the bottom in an upright position by means of rapid to and fro vertical shaking action comprising: a base having a condiment storage chamber and a generally centrally positioned upright discharge spout in the storage chamber originating at an open bottom and terminating in an upper open end so that vertical displacement of the condiment is necessary in order to dispense condiment through the bottom of the discharge spout, the base terminating in an open upper end, a top covering the base and being elongate relative to the base, said top extending above the discharge spout and having a base connecting portion for connection therewith, the top having generally parabolic interior wall surfaces originating at the open end of the base generally in the area of the upper end of the spout and extending mutually upwardly and inwardly thereabove from the base connecting portion to a generally upright elongate narrowed portion directly above the open end of the discharge spout providing a condiment material gathering area in alignment with the open end of the spout, the distance between the interior walls in the narrowed portion being substantially the same as the exterior width of the open end of the spout opening.

2. The condiment dispenser of claim 1 wherein the top has exterior walls which converge upwardly and inwardly from the base connecting portion to a reduced neck in the area of the narrow portion of the interior wall surface above the discharge spout and then diverge slightly outwardly thereabove to provide a narrow grasping surface above the discharge spout for manipulating the dispenser.

References Cited

UNITED STATES PATENTS

| 1,718,684 | 6/1929 | Cobelli | 222—457.5 |
| 1,919,280 | 7/1933 | Langton | 222—457.5 |

FOREIGN PATENTS

| 733,672 | 7/1932 | France. |

ROBERT B. REEVES, Primary Examiner

N. L. STACK, JR., Assistant Examiner